(12) United States Patent
Nickolaou

(10) Patent No.: US 9,335,178 B2
(45) Date of Patent: May 10, 2016

(54) METHOD FOR USING STREET LEVEL IMAGES TO ENHANCE AUTOMATED DRIVING MODE FOR VEHICLE

(71) Applicant: GM GLOBAL TECHNOLOGY OPERATIONS LLC, Detroit, MI (US)

(72) Inventor: James N. Nickolaou, Clarkston, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 87 days.

(21) Appl. No.: 14/166,083

(22) Filed: Jan. 28, 2014

(65) Prior Publication Data

US 2015/0211870 A1     Jul. 30, 2015

(51) Int. Cl.
*G01C 22/00* (2006.01)
*G05D 1/00* (2006.01)
*G01C 21/34* (2006.01)
*G08G 1/16* (2006.01)

(52) U.S. Cl.
CPC ............... *G01C 21/34* (2013.01); *G08G 1/164* (2013.01); *G08G 1/165* (2013.01); *G08G 1/166* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,081,585 A * | 1/1992 | Kurami et al. | ............ | 701/28 |
| 5,146,219 A * | 9/1992 | Zechnall | ............ | 340/995.24 |
| 5,177,462 A * | 1/1993 | Kajiwara | ............ | 340/435 |
| 5,230,400 A * | 7/1993 | Kakinami et al. | ............ | 180/169 |
| 5,278,764 A * | 1/1994 | Iizuka et al. | ............ | 701/301 |
| 5,314,037 A * | 5/1994 | Shaw et al. | ............ | 180/169 |
| 5,327,117 A * | 7/1994 | Kohsaka | ............ | 340/525 |
| 5,357,438 A * | 10/1994 | Davidian | ............ | 701/301 |
| 5,983,161 A * | 11/1999 | Lemelson et al. | ............ | 701/301 |
| 6,084,510 A * | 7/2000 | Lemelson et al. | ............ | 340/539.13 |
| 6,275,773 B1 * | 8/2001 | Lemelson et al. | ............ | 701/301 |
| 6,459,403 B1 * | 10/2002 | Nakahara et al. | ............ | 342/52 |
| 6,567,749 B2 * | 5/2003 | Matsuura | ............ | 701/301 |
| 6,864,784 B1 * | 3/2005 | Loeb | ............ | 340/441 |
| 7,023,333 B2 * | 4/2006 | Blanco et al. | ............ | 340/441 |
| 7,376,247 B2 * | 5/2008 | Ohta et al. | ............ | 382/103 |
| 7,382,274 B1 * | 6/2008 | Kermani et al. | ............ | 340/901 |
| 7,570,783 B2 * | 8/2009 | Wei et al. | ............ | 382/100 |
| 7,684,916 B2 * | 3/2010 | Wei et al. | ............ | 701/50 |
| 7,739,006 B2 * | 6/2010 | Gillula | ............ | 701/24 |

(Continued)

OTHER PUBLICATIONS

V. Kastrinaki, et al.; A survey of video processing techniques for traffic applications; Image and Vision Computing 21 (2003); Jan. 15, 2013; 23 pages; Chania, Greece.

*Primary Examiner* — Bhavesh V Amin
(74) *Attorney, Agent, or Firm* — Reising Ethington, P.C.; Lionel D. Anderson

(57) ABSTRACT

A method that utilizes high-definition street level images provided by a network of stationary traffic cameras to identify potential hazards or concerns located beyond the range of vehicle mounted devices, and to provide an advanced warning or to take some other remedial action in response thereto. In one embodiment, the method uses multiple items taken from the street level images to corroborate a potential concern before saving that concern to a concern profile where the concern is linked or otherwise associated with a particular geographic zone. By taking remedial actions well in advance of a potential concern, the method provides more opportunity to adjust or otherwise address the potential concern, which can be particularly advantageous when the host vehicle is being operated in an automated driving mode.

18 Claims, 3 Drawing Sheets

(56) References Cited

U.S. PATENT DOCUMENTS

| | | | |
|---|---|---|---|
| 7,783,403 B2* | 8/2010 | Breed | 701/45 |
| 7,904,218 B2* | 3/2011 | Jochem et al. | 701/28 |
| 8,060,260 B2* | 11/2011 | Huang et al. | 701/1 |
| 8,086,406 B2* | 12/2011 | Ewerhart et al. | 701/301 |

* cited by examiner

METHOD FOR USING STREET LEVEL IMAGES TO ENHANCE AUTOMATED DRIVING MODE FOR VEHICLE

FIELD

The present invention generally relates to enhancements for vehicles having automated driving modes, and more particularly, to methods and systems that enhance a driving experience of an automated driving mode through the use of street level images, such as those provided by stationary traffic cameras.

BACKGROUND

It is known for host vehicles to be equipped with object detection capabilities, such as vehicle mounted cameras, lasers, ultrasounds and sensors. These types of devices have a field of view that typically extends a certain distance ahead of the host vehicle and can detect the presence of target vehicles and other objects, as well as certain features in upcoming road segments. The output provided by these vehicle mounted devices can provide some information regarding potential upcoming hazards or concerns, but that information is usually limited or confined to the field of view, the range of the device, or the estimated horizon of a digital map.

It may be desirable in certain circumstances, like those encountered during the use of automated or autonomous driving modes, to obtain information about road segments that are beyond the field of view of vehicle mounted devices (i.e., far forward sensing). Access to such information may give a vehicle operating in an automated driving mode advanced warning of a hazard or concern so that one or more remedial actions can be taken.

SUMMARY

According to one embodiment, a method of enhancing an automated driving mode of a host vehicle, comprising the steps of: comparing a host vehicle location to a geographic zone saved in a concern profile, and the host vehicle location corresponds to a current location of the host vehicle or an anticipated future location of the host vehicle and the concern profile is based on street level images gathered from a plurality of image sources; identifying a potential concern in response to the comparison of the host vehicle location to the saved geographic zone, and the potential concern is associated with the geographic zone in the concern profile; and performing a remedial action in response to the identification of the potential concern, wherein the remedial action is performed before the host vehicle encounters the potential concern and the remedial action affects the automated driving mode of the host vehicle.

According to another embodiment, there is provided a method of enhancing an automated driving mode of a host vehicle, comprising the steps of: gathering street level images from one or more image source(s), and the street level images are of a particular road segment that is beyond the range of sensors mounted on the host vehicle; identifying first and second items from the street level images that pertain to a potential concern with the particular road segment; evaluating the first and second items from the street level images and corroborating the potential concern by determining if both the first and second items verify the presence of the potential concern; and saving the potential concern in a data collection that is stored in electronic memory so that the host vehicle can later access the data collection and determine if there are any potential concerns that may affect the host vehicle when it is being driven in the automated driving mode.

DRAWINGS

Preferred exemplary embodiments will hereinafter be described in conjunction with the appended drawings, wherein like designations denote like elements, and wherein.

DESCRIPTION

Figure 1:
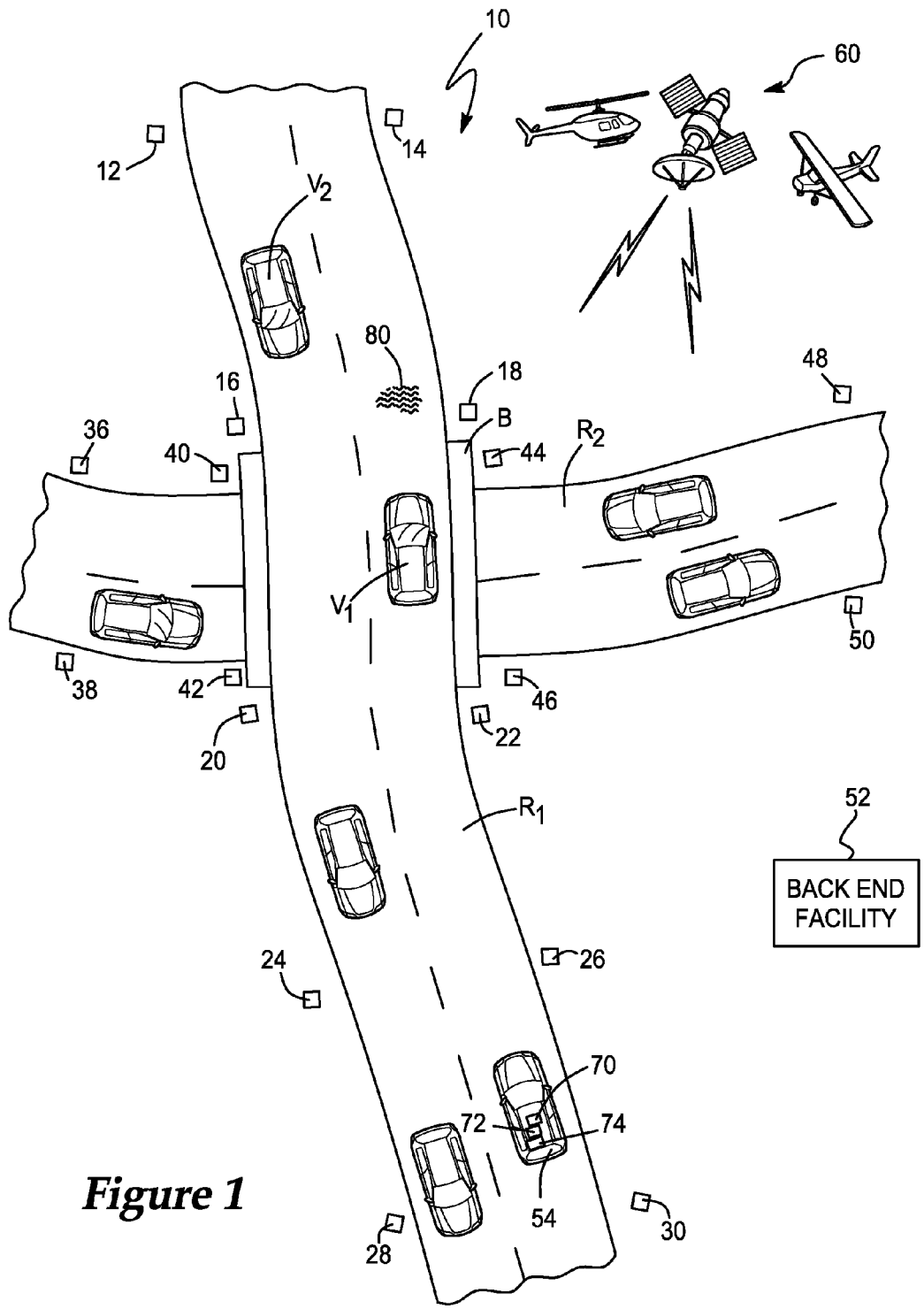
FIG. 1 is a schematic view of several roadways being driven on by a host vehicle and a number of target vehicles, where the host vehicle is interacting with components of an exemplary embodiment of the driving enhancement system.

The system and method described herein can enhance a driving experience of a vehicle in an automated driving mode through the use of street level images, such as those provided by stationary or roadside traffic cameras, sensors or other devices. Many stationary traffic cameras now possess high-resolution or high-definition capabilities, which enable them to provide higher quality still images or video containing more information. The additional information extracted from the street level images allows the present system and method to better recognize, identify, classify and/or evaluate various hazards or concerns in upcoming road segments, including those that are far forward and beyond the field of view of vehicle mounted devices. Depending upon the type and severity of hazard or concern, the present system and method may develop remedial measures, such as adjusting an operating parameter of the automated driving mode, disabling the automated driving mode, or simply alerting the driver of the concern. Moreover, the additional information gleaned from the street level images can allow for better redundancy or corroboration to verify the presence and nature of the hazard or concern before implementing the remedial measures.

The system and method described herein may be particularly well suited for vehicles employing some type of automated, automated or self driving mode. The terms "automated," "automated driving" and "automated driving mode," as used herein, broadly include any fully-, semi- or partially automated, automated or self driving mode or state where the vehicle automatically controls one or more aspects of driving based on gathered feedback and without input from the driver. The National Highway Transportation Safety Administration (NHTSA) has recently classified automated or automated driving into the following levels based on the functionality and degree of autonomy: level 0 (no automation)—the driver is in complete and sole control of the primary vehicle controls (braking, steering, throttle and motive power) at all times; level 1 (function specific automation)—automation at this level involves a specific control function (e.g., electronic stability control or pre-charged brakes) where the vehicle automatically assists with one of the primary vehicle controls in order to enable the driver to regain control or act more quickly than is possible if the driver acted alone; level 2 (combined function automation)—this level involves automation of at least two of the primary vehicle controls working in unison so that the driver is relieved of control of those functions (e.g., adaptive cruise control (ACC), automated lane centering, automated lane keeping, automated lane changing); level 3 (limited self driving automation)—automation at this level enables the driver to cede full control of all safety-critical functions under certain traffic or environmental conditions and to rely heavily on the vehicle to monitor for changes in those conditions that would necessitate transition back to driver control (e.g., the Google car is a limited self driving vehicle that expects the driver to be available for occasional control); level 4 (full self-driving automation)—at this level, the vehicle is designed to perform all safety-critical functions and to monitor roadway conditions for an entire trip, and the design expects that the driver will provide destination and navigation input but is otherwise unavailable for control during the trip (e.g., this includes both occupied and unoccupied vehicles). The present system and method may be used with a vehicle operating at any of the aforementioned automated "levels," as well as manual or non-automated driving modes.

With reference to FIG. 1, there is shown a schematic view of an exemplary embodiment of a driving enhancement system 10 that includes a first set of stationary traffic cameras 12-30 installed along a first roadway R1 and a second set of stationary traffic cameras 36-50 installed along a second roadway R2, a back-end facility 52, and a host vehicle 54. In this particular example, the first roadway R1 passes over the second roadway R2 via a bridge or overpass B. But it should be noted that the present system and method may be used with any number of different roads, road networks or highway systems, including those having highways, surface streets, toll roads, urban or rural roads, overpasses or underpasses, entrance or exit ramps, tunnels, bridges, intersections, traffic lights, stop signs, etc., and that the particular roadway configuration in FIG. 1 is only one potential example.

The stationary traffic cameras 12-30 and 36-50 provide the system 10 with still images, video and/or other information pertaining to different segments of roadways R1 and R2, respectively, so that relevant information can be extracted and used by the present method to enhance the driving experience. In many instances, entire networks of stationary traffic cameras are already in place and provide real-time or nearly real-time traffic information to various public or governmental entities (e.g., departments of transportation) and private entities (e.g., toll road operators, traffic news outlets and wireless service providers), which in turn use that information to provide up-to-date traffic related services. The present system and method seek, when possible, to utilize traffic cameras and traffic camera networks that are already in place and to receive the output of such devices at a backend facility 52. In the past, utilization of already existing traffic camera networks could be somewhat hampered by the relatively poor image resolution of those cameras, however, more and more stationary traffic cameras are now being outfitted with high-resolution and/or high-definition capabilities. Precise definitions or specifications for the terms "high-resolution" and "high-definition" can vary, depending on their particular application, but in the present case these terms generally refer to any still image, video and/or other data provided by stationary traffic cameras where there is enough information to allow for specific hazards or concerns (e.g., glare on the road surface, the state of window wipers on passing cars, the presence of lane closures, etc.) to be identified and used by the present method. In the present application, the term "high-definition" is used interchangeably with "high-resolution" and applies to still images, video or both, as defined above.

Generally speaking, road safety cameras like those that enforce speed limits or traffic lights take still photos having very high resolution in response to a trigger event (e.g., enough resolution to make out the individual alphanumeric characters of a license plate), whereas some traffic cameras consistently monitor sections of a roadway and may take video with a somewhat lower resolution than that of the road safety cameras but still enough resolution to discern things such as the general condition of a road surface (i.e., high-definition). While the driving enhancement method is primarily designed for use with traffic cameras that provide video output, it is possible for the method to work with road safety cameras that provide still images or with cameras that are used in conjunction with laser, radar, lidar and/or other sensors for further processing. In several potential embodiments, the method may use high dynamic range imaging (HDRI or HDR), frequency band analysis, hyper spectral imaging, and other techniques that improve the ability of the method to analyze the output of the roadside cameras across a wide spectrum of frequencies, both within and outside of the visible light range.

It should be appreciated that while the stationary traffic cameras 12-30 and 36-50 are shown in FIG. 1 in terms of stand alone roadside cameras, this is just for purposes of illustration. Those cameras could just as easily be mounted overtop of the roadway on an arm or gantry, be mounted on poles supporting road signs, traffic lights or other devices, be mounted on overpasses, bridges or other structures, be mounted in the road surface itself, or be mounted according to some other suitable configuration. The stationary traffic cameras 12-30 and 36-50 may be designed to rotate, tilt, zoom in, zoom out, pan, or they could simply be immobile or fixed. Examples of potential camera types include pan-tilt-zoom (PTZ) cameras, closed circuit television (CCTV) cameras, internet protocol (IP) cameras, still imaging cameras, and illuminated or non-illuminated cameras, just to name a few. For those stationary traffic cameras that can rotate or change the direction of their field of view, the cameras may include a built in compass and provide a cardinal direction along with their still image or video output. The stationary traffic cameras 12-30 and 36-50 may include laser, radar, lidar or other types of sensors or devices that are designed for use outside of the visible light range and can provide data and information in addition to that obtained from images alone. It is possible for the stationary traffic cameras 12-30 and 36-50 to be connected to the back-end facility 52 via a wired connection (e.g., a fiber optic, cable or other wired connection), via a wireless connection, directly connected to one another, or indirectly connected to one another via other monitoring centers or intelligent transportation systems, to cite a few possibilities. The particular type of camera, the particular mounting arrangement of the camera, the particular location of the camera, the particular combination of sensors and devices, the particular connection between the camera and the back-end facility, etc. is not imperative to the present method and system, as any suitable arrangement may be used.

According to another possibility, any number of optional image sources 60 may also provide system 10 with still images and/or video of the road segments in question. For example, one or more satellites, unmanned aerial vehicles (UAVs) or drones, airplanes, helicopters, etc. may be equipped with aerial-mounted still or video cameras and used in lieu of the stationary traffic cameras discussed above, or these optional image sources may be used to supplement or enhance the stationary traffic camera images instead of replacing them. It should be understood that more or less image sources may be used, as well as different types of image sources. In another possible example, the additional image sources 60 include cameras mounted on other vehicles that are wirelessly connected to back end facility 52 or some other central system and are providing that system with real-time images or meta data extracted from the imagery. Indirect image sources, such as internet websites, webcams, and wireless service providers that offer street level video, images or real time camera feeds may also be used. There is no specific limit on the number or combination of images sources that may be employed, including the stationary traffic cameras 12-30 and 36-50 shown and described.

Back end facility 52 receives still images, video and/or other information from one or more stationary traffic cameras 12-30 and 36-50, it processes that output according to the driving enhancement method described below, and then provides corresponding instructions, commands and/or other information to one or more host vehicles 54 so that the driving experience associated with those vehicles can be improved. The back end facility 52 may include any combination of servers, computers, databases, switches, routers, data storage facilities and/or other electronic devices needed to carry out the present method, and it may be completely automated or staffed with live employees, to name a few possibilities. While it is expected that the back end facility 52 will communicate with the one or more host vehicles 54 wirelessly, the particular manner in which that wireless communication is carried out is not essential. Skilled artisans will appreciate that some, most, or even all of the electronic instructions or steps that help make up the driving enhancement method described herein may be carried out at the back end facility 52. The precise division of tasks or processing steps between the back end facility 52 and the host vehicle 54 may be made according to any suitable processing scheme. Although the back end facility 52 is depicted in FIG. 1 as a stand alone building, it should be appreciated that the back end facility could include any suitable processing resources and could be used in conjunction with an associated website, an application (so-called "app") for a mobile device, a program or other software for a computer, etc.

Host vehicle 54 is depicted in the illustrated embodiment as a passenger car, but it should be appreciated that any other vehicle including motorcycles, trucks, sports utility vehicles (SUVs), or recreational vehicles (RVs), can also be used. Host vehicle 54 may include any number of different hardware components and other devices, including various types of sensors 70, a telematics unit 72, and a control module 74. Sensors 70 may generate readings that are representative of the position, velocity, acceleration, yaw rate and/or other vehicle dynamics of host vehicle 54, or they may generate readings that are representative of the position, velocity, acceleration, etc. of one or more nearby objects or target vehicles. Different sensors and sensing techniques may be utilized, including those that use rotational wheel speed, ground speed, accelerator pedal position, gear shifter selection, accelerometers, engine speed, engine output, throttle valve position, radar, laser, lidar, cameras, etc., to name but a few. Positional information may also be obtained from an optionally equipped GPS module. Telematics unit 72 enables wireless voice and/or data communication over a wireless carrier system so that the host vehicle can communicate with the backend facility 52, other telematics-enabled vehicles, or some other entity or device. Any suitable telematics unit 72 and wireless communication scheme may be employed by the driving enhancement system 10. Control module 74 may communicate with sensors 70, telematics unit 72 and/or any other components, devices, modules, systems, etc. on the host vehicle 54, and may be used to carry out some, most or even all of the electronic instructions or steps that help make up the driving enhancement method described herein. The control module 74 can be any type of device capable of processing electronic instructions and may include one or more processors, microprocessors, microcontrollers, host processors, controllers, vehicle communication processors, and application specific integrated circuits (ASICs). The control module can execute various types of digitally-stored instructions, such as software or firmware programs stored in memory, which enable the control of various vehicle functions.

Depending on the particular embodiment, the telematics unit 72 and/or control module 74 may be a stand-alone vehicle electronic module (e.g., a sensor controller, an object detection controller, a safety controller, etc.), may be incorporated or included within another vehicle electronic module (e.g., automated driving control module, active safety control module, brake control module, steering control module, engine control module, etc.), or may be part of a larger network or system (e.g., automated driving system, adaptive cruise control system, lane departure warning system, active safety system, traction control system (TCS), electronic stability control (ESC) system, antilock brake system (ABS), etc.), to name a few possibilities. Accordingly, the telematics unit 72 and/or control module 74 is not limited to any one particular embodiment or arrangement and may be used by the present method to control one or more aspects of the vehicle's operation.

Figure 2:
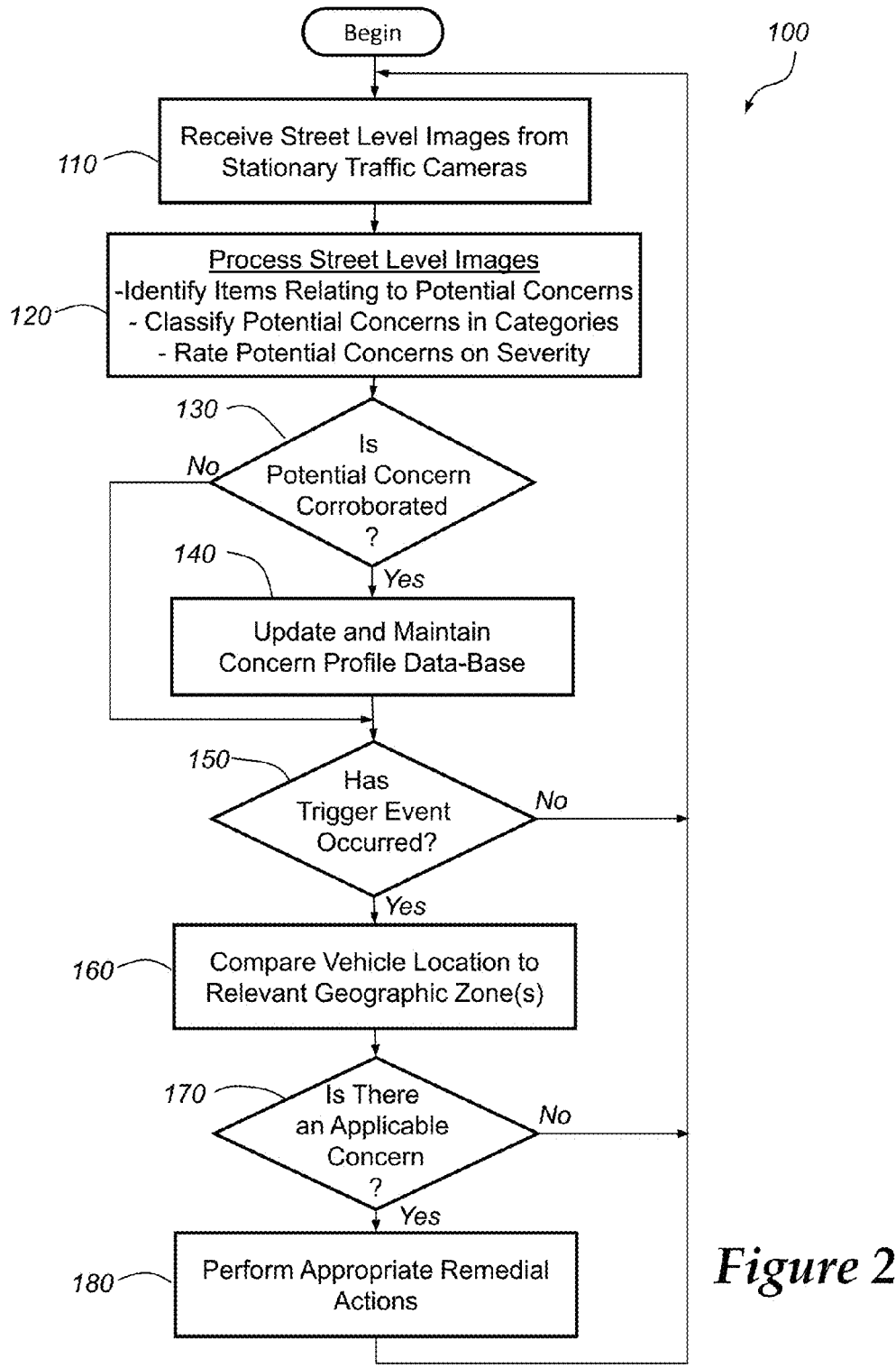
FIG. 2 is a flowchart illustrating an exemplary embodiment of the driving enhancement method and may be used with a host vehicle, such as the one from FIG. 1.

Turning now to FIG. 2, there is shown an embodiment of a driving enhancement method 100 that may utilize street level images provided by a network of stationary traffic cameras to identify potential hazards or concerns located beyond the field of view of vehicle mounted sensors, and to provide an advanced warning or to take some other remedial action in response thereto. Again, it should be appreciated that method 100 may be used with a host vehicle that is being operated in an automated driving mode or a manual driving mode.

Beginning with step 110, the method receives high-resolution and/or high-definition street level images from one or more stationary traffic cameras. For purposes of simplicity, the term "high-definition" will be used in the remainder of the application to mean "high-definition," high-resolution" or both, as defined above (it was previously explained that these terms are being used herein interchangeably). In an exemplary embodiment of step 110, street level images of roadway R1 are received from stationary traffic cameras 12-30 and street level images of roadway R2 are received from stationary traffic cameras 36-50. The street level images may be received directly from stationary traffic cameras 12-30, 36-50 that are connected to the back end facility 52 via the internet or some other communications network, or the images may be received indirectly through some monitoring center or intelligent transportation system (e.g., a center or system managed by a department of transportation or toll road operator). As mentioned above, it is also possible for step 110 to receive images and/or other information from one or more optional image sources 60.

Skilled artisans will appreciate that street level images, such as the ones received in step 110, are oftentimes accompanied with certain data or information that helps put the image into better context. For example, each time step 110 is performed, the back end facility 52 may receive from each of the stationary traffic cameras 12-30, 36-50 a packet, message, file and/or other data transfer that includes an image of the roadway along with some combination of: a camera identifier identifying the particular camera that took the image, a time stamp corresponding to when the image was taken, and/or a camera position indicating the location of the camera that took the image. The back end facility 52 can maintain a map or database of the various roadways being monitored that includes all of the known stationary traffic cameras so that if an image is received with a particular camera identifier, it may be unnecessary to also gather the camera position. Of course, the aforementioned examples of data that may accompany the image are not meant to be limiting, as other data or information may also be provided with the image (e.g., camera angle or orientation). The camera identifier and/or position data may be used by the present method to organize the various images into discrete geographic zones or areas. This can be particularly useful when large numbers of street level images are being received from dozens, hundreds, or possibly even thousands of different stationary traffic cameras, and the present method is attempting to organize these images in an efficient, practical and useful manner, as will be described in more detail.

Step 110 may be performed or executed by method 100 at any suitable frequency and is not limited to the once-per-method illustration shown in FIG. 2. Stated differently, step 110 may be constantly running in the background so that street level images are periodically being gathered from the various stationary traffic cameras according to a suitable frequency, even though other steps of method 100 are being performed at a different frequency. The flowchart in FIG. 2 suggests that step 110 is performed each time that step 120 is performed, however, it may be that if one of these steps is more processor or resource intensive than the other, it is performed at a different frequency. Furthermore, step 110 may gather street level images from certain stationary traffic cameras more frequently (e.g., cameras that are located on high traffic roadways, that are located on roadways undergoing known construction projects, that are spaced further apart from adjacent cameras, etc.) than it obtains images from other stationary traffic cameras. In another possible example, step 110 staggers or otherwise divides up the image gathering process so that it does not attempt to gather street level images from all of the stationary traffic cameras in a large camera network at the same time. The preceding examples are meant to demonstrate some of the potential ways in which step 110 may receive or otherwise obtain street level images from the different stationary traffic cameras, and they are meant to emphasize that step 110 is not limited to any particular embodiment. Once the street level images have been received, the method proceeds to step 120.

Next, step 120 processes the street level images that were previously received by identifying one or more item(s) in a particular road segment and evaluating those item(s) in order to identify a potential hazard or concern with that particular road segment. Some, most or all of step 120 can be performed at the back end facility 52; but this is not mandatory, as certain image processing steps could be performed before the street level images are provided to facility 52. The particular image processing techniques that are employed will be influenced by the type, format and/or content of the street level images being processed. For example, if a stationary traffic camera or other image source provides real-time streaming video, then step 120 may extract still images from the video prior to processing or it may process the streaming video itself. Further, step 120 may employ techniques where two or more street level images are processed or evaluated together, such as when the images are from the same traffic camera (e.g., images captured at different times) or from different cameras (e.g., images captured by adjacent cameras with nearby or overlapping fields of view). Processing multiple images may provide the method with some degree of redundancy or corroboration that is particularly useful when identifying and potentially reacting to the presence of potential hazards or concerns.

To illustrate this point, consider the examples where stationary traffic cameras 16, 18 or cameras 14, 18 take street level images of a section of roadway R1 at approximately the same time. Step 120 may utilize stereo imaging or other techniques to process these images jointly in order to obtain a more comprehensive, detailed street level image or picture of that particular roadway segment. It is also Possible to develop 2D or even 3D models based upon the various street level images, where the models are updated as subsequent street level images are received. Beyond the optional reconciliation of street level images, the images themselves may be processed or treated in order to better prepare them for subsequent evaluation. Any suitable image processing techniques may be used including, but not limited to, thresholding, edge detecting, transforming, matching, filtering, segmentation, classification techniques, object and feature detection, surface friction prediction, frequency waveform analysis, as well as any others known in the art. Some examples of potential image processing and other techniques are provided in *A Survey of Video Processing Techniques for Traffic Applications*, Kastrinaki, Zervakis, Kalaitzakis, Image and Vision Computing 21 (2003) 359-381, the contents of which are incorporated herein by reference.

At this point, step 120 can evaluate the items identified in the street level images in order to classify any potential hazards or concerns that the present method may wish to address. Classification of such concerns can be carried out in any number of different ways. For example, potential concerns that are based on items extracted from the street level images in step 120 may be classified into one or more predetermined categories or groups, such as: construction concerns, traffic concerns, and weather concerns, to cite a few possibilities. These categories may not be entirely mutually exclusive, as one concern or event may be considered both a construction concern and a traffic concern, and the respective categorization may vary from that described below depending on the particular implementation of the present method. It should also be recognized that it is possible to categorize a concern or hazard in multiple categories and then continue with the method. This particular embodiment may allow for more lenient severity determinations, or no determination of severity at all, as will be described more fully below.

The term "construction concern," as used herein, broadly includes any object, person, condition, event, indicia and/or other item from a street level image that suggests the presence of road construction or road repair. Some non-limiting examples of potential construction concerns include: construction barrels, barricades, lane closures, lane shifts, lane marking occlusions, various temporary and permanent signs (detour signs, flashing arrow or message signs, etc.), construction equipment (backhoes, front loaders, bulldozers, vehicles, generators, etc.), work crews, and alterations from base navigation maps, to name a few. Any item or object that can be extracted from a street level image and that indicates construction on a particular segment of road may constitute a construction concern. For instance, street level images may be used to determine the actual curvature or other characteristics of a particular lane or road segment, which can then be compared to navigational or map data in order to determine if there is a deviation indicating a lane shift or other construction event. Different types of construction concerns may have different levels of severity or importance, and may or may not be weighted as such. For example, a road closure or barricade may be assigned a higher severity level than a construction barrel. The quantity or extent of concerns may also impact the severity. For instance, ten or more construction barrels may be considered a severe concern, but less than ten construction barrels only a mild concern. The severity that is assigned or attributed to a particular construction concern may affect the corresponding remedial action that is taken, as will be explained. In another example, positions of the barrels may be used to determine if the construction area is active or not (e.g., if the barrels are off to the side of the road, this may indicate an inactive construction zone). In a particular embodiment, the construction concerns may be delineated into bidirectional or unidirectional concerns. For example, if the street level images show a road crew present on the northbound lanes of a particular highway, a construction concern may only be attributed to the northbound lanes and not to the southbound lanes even though they are in the same geographic zone. A construction project that reduces a four-lane road down to a two-lane road may be deemed a bidirectional construction concern.

The term "traffic concern," as used herein, broadly includes any object, person, condition, event, indicia and/or other item from a street level image that suggests the presence of certain traffic conditions. Traffic concerns may include, but are not limited to, traffic jams or backups, traffic patterns, stationary or slow moving objects in the road (e.g., a disabled or broken down vehicle), emergency vehicles, tow trucks, debris in the road (e.g., downed branches, power lines, etc.), emergency personnel directing traffic, paths of moving vehicles not in line with normal traffic flows, etc. As with construction concerns, traffic concerns may be assigned a severity level or weighted, and may also be deemed bidirectional or unidirectional. In one example, the method uses the street level images from one or more stationary traffic cameras to identify and evaluate a group of vehicles on a particular roadway segment. If the average spacing between the vehicles is below a threshold or if the average distance moved of a vehicle between camera frames is less than a threshold, then the method may determine that the vehicles in the street level images are in a traffic backup of some type. Of course, any number of other techniques may also be used to evaluate traffic conditions based on objects or other items extracted from street level images.

The term "weather concern," as used herein, broadly includes any object, person, condition, event, indicia and/or other item from a street level image that suggests the presence of certain weather conditions. Some weather concerns include conditions that are detected from the street level images and directly indicate the presence of certain weather conditions, like glare on the road (indicating rain, snow or ice), snow on the vehicles, and clouded or blurred images indicating the presence of fog, smoke or high winds, salt covered roads, gravel/sand covered paint lines, for example. Other weather concerns include conditions that indirectly suggest the presence of weather conditions, like active window wipers of passing vehicles (suggesting rain, snow or ice), the presence of salt trucks or snow plows, lane markings being obscured or occluded (suggesting that they are being covered up by snow, salt or ice), greater average vehicle spacing or slower average vehicle speeds (suggesting low friction coefficient road surfaces), etc. Many weather concerns relate to the presence of precipitation. As with construction and traffic concerns, weather concerns may be assigned a quantitative or qualitative severity level, may be weighted, or may be deemed bidirectional or unidirectional. Consider active window wipers, for example, if a large percentage of vehicles on a particular segment of road are operating their window wipers, this suggests the presence of precipitation or wet road surfaces spraying up from lead vehicles. In the past, it may not have been feasible to extract such items from street level images that were not of high-resolution or high-definition, as the images may not have been clear enough to discern such items with a high level of confidence.

As mentioned above, the various concerns or hazards that are detected from the street level images may be rated or weighted according to their potential severity and impact on vehicles traveling the particular road segment in question, like host vehicle 54. Even though the flowchart of FIG. 2 shows this step being performed in step 120, it should be appreciated that it may be carried out in step 130, step 140, some other step, or a combination thereof. Consider the example illustrated in FIG. 1 where host vehicle 54 is travelling northbound on roadway R1 and stationary traffic cameras 16, 18 are capturing and providing street level images of a road segment to back end facility 52 (it should be appreciated that cameras 16, 18 may be located far ahead of host vehicle 54 and well beyond the range of vehicle-mounted sensors). Step 120 has identified what appears to be a patch of ice 80 on the road (a weather concern) from glare in the street level images. Before issuing a warning to the host vehicle 54 or taking some other remedial action, the method may first attempt to corroborate the weather concern 80 by evaluating the street level images and looking for other signs of ice. In this case, the street level images provided by traffic cameras 16, 18 show that vehicles V1, V2, which are in the same area as the suspected ice patch 80, are operating their window wipers, which is indicative of precipitation that could lead to an ice patch; that is, corroboration or verification. According to this example, the ice patch 80 could be assigned a low severity rating before it is corroborated, a moderate severity rating once it is confirmed by the active window wipers, and potentially a high severity once it is confirmed and once the method recognizes that the ice patch is on or near a bridge B, which is more prone to ice than other road surfaces. If ice patch 80 appears to be quite large or if there are disabled vehicles near the ice patch, for example, these are indicia that are acquired from the street level images and may affect the severity level or rating of that particular weather concern. This feature is optional and the potential techniques and methods for rating that may be used are numerous.

Step 130, which is optional and is not necessarily required, determines if a particular concern has been corroborated or otherwise verified. Certain construction, traffic and/or weather concerns may be self evident and therefore may not require corroboration. However, because of the nature, location, severity, etc. of some construction, traffic and/or weather concerns, it may be beneficial to introduce a certain amount of redundancy into the system by looking to other items identified from the street level images for corroboration. Returning to the example above regarding the ice patch 80, step 130 may use both of these weather concerns (i.e., the patch and the wipers) in order to infer with higher confidence that there is in fact a patch of ice or other precipitation on the road segment near cameras 16, 18. Step 130 could require that a certain number or percentage of passing vehicles be operating their window wipers before concluding that the patch 80 has been corroborated, or it could employ some other form of corroboration instead. Again, there are numerous corroboration or verification techniques that could be employed and the present method is not limited to the active wipers example provided herein. It is possible for step 130 to be incorporated into step 120 or some other step of the present method, as it does not have to be a separate and independent step, as is schematically illustrated in FIG. 2.

Step 130 may employ same camera corroboration (i.e., images from the same camera or cameras are used to verify the presence of a certain concern, perhaps by looking at the images over a period of time), or it may use different camera corroboration (i.e., images from a nearby camera or cameras are needed to corroborate a certain concern). In some instances, the nature of the concern itself may provide enough confirmation as to its presence so that redundancy is unnecessary (e.g., if a traffic backup is unambiguously captured by a traffic camera and there are no other cameras around, then this may suffice for purposes of corroboration). Skilled artisans will appreciate that corroboration of a particular construction, traffic and/or weather concern, particularly when that concern is located far ahead of a host vehicle 54 and is well beyond the range of vehicle mounted sensors, may be particularly useful, especially in the context of automated driving modes where corroborated concern may be used to alter or even disable the automated driving features. If a particular concern is adequately corroborated or confirmed, the method may proceed to step 140. If, on the other hand, the concern is considered uncorroborated, then the method may bypass step 140 and continue to step 150. This optional corroboration step may be similarly implemented with construction and/or traffic concerns, as the weather concerns discussed above were simply intended to be examples.

Step 140 maintains an up-to-date concern profile of the various concerns and hazards located throughout an entire road network or system. This can be a complex task, especially if there are hundreds or thousands of traffic cameras involved, and there are many potential ways in which it may be accomplished. According to one possibility, a first portion of the present method (e.g., steps 110-140) may continuously run in the background, independent of the status or location of the host vehicle 54, so that a dynamic database or other data collection of concerns is established and available for use. This concern profile can then be accessed by a second portion of the present method (e.g., steps 150-180), which uses the location or anticipated location of one or more host vehicles 54 to check the concern profile and determine if there are concerns or hazards in the corresponding geographic zones. It is possible that one entity will build and maintain the data collection (the first portion) and then sell or otherwise provide access to other entities, which can then access the data and use it to enhance the driving experience of one or more host vehicles (the second portion). In this scenario, it is not necessary for a single entity to perform all of the steps of method 100, although one could. Other arrangements are certainly possible.

Figure 3:
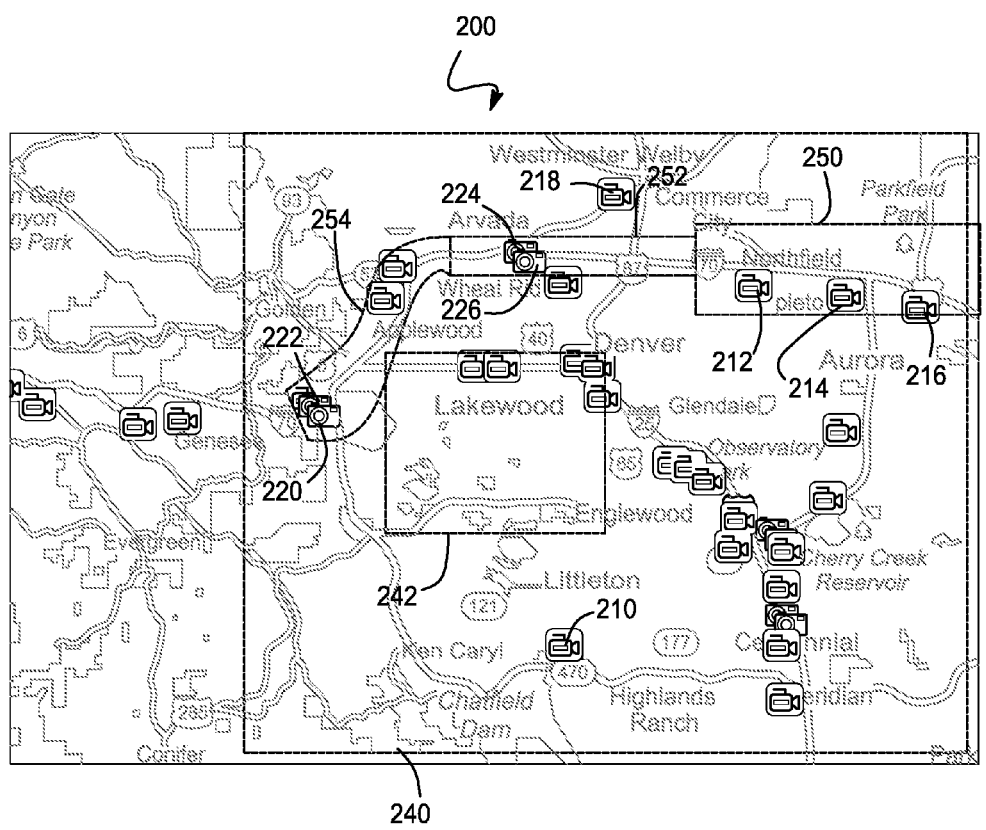
FIG. 3 is a pictorial representation of one or more potential geographic zones that may be used in accordance with the driving enhancement system and method, like those shown in FIGS. 1 and 2.

The information regarding potential concerns or hazards that is gleaned from the network of traffic cameras may be organized according to geographic zones. A geographic zone may be defined or delineated in terms of area (e.g., certain number of square miles, by radius, by zip code, by city, township, county, etc.) or in terms of the roadway (e.g., an entire road or highway, or just a segment or portion of a road could constitute a geographic zone). With reference to FIG. 3, there is shown a map 200 of the Denver metropolitan area that is provided by the Colorado Department of Transportation and is publically available and accessible through the Colorado Department of Transportation website. In the map 200, sources of street level images are represented as either video camera icons 210-218 or still camera icons 220-226. According to several different examples, a geographic zone may be all of metropolitan Denver, including all of its various roadways, depicted as zone 240; a geographic zone could be smaller geographic areas, like the city or suburb of Lakewood and its various roadways, depicted as zone 242; a geographic zone could be one or more individual roadways such as I-70 or I-25; or, according to a preferred embodiment, a geographic zone could encompass a certain segment or portion of a particular roadway, like segments 250-254 of I-70. It may be beneficial to correlate the size of a geographic zone with the number of traffic cameras in that zone, the average volume of traffic passing through that zone, or some other suitable criteria. Geographic zones may be smaller in urban areas, like Denver, where there is heavy traffic flow and larger in more rural areas. It should be appreciated that the exact manner in which geographic zones are set or defined can vary depending on the particular needs of the application and are not limited to the examples cited above. The following description is in the context of geographic zones that are defined as segments of a specific highway or road, but this is not necessary. It should be appreciated that map 200 has simply been provided for purposes of illustration and is in no way meant to limit or constrain the manner in which the street level images may be gathered, processed and/or stored.

Turning back to FIG. 2, when a potential concern or hazard has been identified from a street level image and may be even corroborated, step 140 uses the information associated with the corresponding image to assign that concern to a specific geographic zone. Consider the example where traffic camera 212 provides high definition video of a segment of I-70 and, from this video, street level images are used to reveal the ice patch 80 in FIG. 1. In such an example, step 140 could use the camera identifier or the camera position information that accompanied the street level images to assign this weather concern (i.e., the ice patch 80) to geographic zone 250. It is envisioned that a geographic zone, like zone 250, would have a number of different concerns (construction, traffic, weather or others) associated with it and stored in the concern profile so that when a host vehicle 54 enters or is expected to enter zone 250, the method could look at all of the current concerns in that particular zone and determine if any were relevant to the host vehicle. In this way, step 140 may help build or construct a concern profile, which can be in the form of a database, a 2-D model or even 3-D model and can be maintained at backend facility 52 or some other suitable site. If a modeling approach is used to chronicle the various concerns, step 140 may use the new concern to edit or adjust the current version of the model. If using a list, step 140 could simply add new concerns to the list. Even though it is not shown on the flowchart in FIG. 2, method 100 should also include one or more steps for removing old concerns from the concern profile once they have abated or have otherwise gone away. If this collection of information is to be used to issue warnings or initiate other remedial actions, it is important that it be up to date.

Step 150 determines if a trigger event has occurred. Trigger events may include, but are not limited to, activating or enabling an automated driving mode, requesting a navigation route, driving a vehicle into a new geographic zone, or any other event that may indicate that access is needed to the concern profile being built and maintained in steps 110-140. For example, if a driver of host vehicle 54 initiates an automated driving mode, then telematics unit 72 could send a wireless message to back end facility 52, where the concern profile is maintained, that acts as a trigger event and causes the present method to look at the concern profiles for each of the geographic zones through which the host vehicle is expected to drive. In another example, when a vehicle user requests a navigational route (e.g., the route could be requested at the host vehicle or through an affiliated web site), the route request can serve as a trigger event and cause the method to evaluate the concern profile for each of the geographic zones that encompass part of the navigational route. In yet another example, entering a new geographic zone while the host vehicle 54 is in an automated driving mode could constitute a trigger event that automatically causes the method to consider the corresponding concern profile for that particular geographic zone. There are many other possibilities for what could potentially qualify as a trigger event. If a trigger event is detected, then the method continues on to step 160; if no trigger event is detected, then the method may loop back to continue monitoring and updating the concern profile.

Step 160 compares the host vehicle location to one or more relevant geographic zones. The "host vehicle location," in this context, refers to either the present location of the host vehicle or an anticipated future location of the host vehicle that is based, for example, on a known navigational route or an expected route extrapolated from a current trajectory. Stated differently, this step compares a present location or an expected future location of the host vehicle 54 to the different geographic zones that are maintained in the concern profile in order to determine if the host vehicle is likely to encounter any geographic zones where there are corresponding concerns or hazards that the driver should know about. Some non-limiting examples of how step 160 may be carried out include: comparing the present location of the host vehicle 54 to the various geographic zones that are saved in the concern profile; comparing the anticipated future location of the host vehicle, based on a navigational route that has been sent to the host vehicle, to the saved geographic zones; and comparing the anticipated future location of the host vehicle, based on an extrapolation of the host vehicle's current heading as reported by sensors 70 or the like or based on an automated driving mode, to the saved geographic zones, to cite a few examples. Other ways to execute this step will be apparent to one having ordinary skill in the art. This step may be accomplished at the backend facility 52, at the host vehicle 54, or at a combination thereof. For example, the host vehicle may send its present or future location to the backend facility 52 for comparison, or the backend facility may send geographic zone information from the concern profile to the host vehicle. In any case, the method determines if the host vehicle is already located in or is likely to enter a specific geographic zone, and then the method proceeds to step 170.

Step 170 determines if there are one or more potential concern(s) associated with the geographic zone in question. As previously mentioned, the concern profile may include data that represents a number of different geographic zones, and each one of which may include a number of different potential concerns, such as construction, traffic or weather concerns. If this step determines that there are in fact one or more potential concerns for the specific geographic zone in question, then the method may proceed to step 180 so that an appropriate remedial action or response can be devised for responding to the potential concern. If there are no potential concerns associated with that particular geographic zone, then the method can loop back for continued monitoring, etc. In some cases, this step may look up multiple geographic zones, such as the case when the host vehicle 54 is expected to follow a certain navigational route that will take the vehicle through more than one geographical zone.

In step 180, the method performs one or more remedial actions in response to potential concerns previously identified. Remedial actions may include, but are not limited to, alerting a driver of the host vehicle of upcoming potential concerns, querying a driver of the host vehicle so that they must respond or acknowledge the warning (e.g., by requiring some type of acknowledging eye movement or requiring the driver to grip the steering wheel), changing or adjusting the parameters of an automated driving mode, disabling an automated driving mode all together, etc. It is preferable that whatever remedial actions are taken that they are carried out far enough in advance of the potential concerns so that the driver or the automated driving mode has adequate time to adapt or address the concerns. For example, if the host vehicle 54 is operating in an automated driving mode along a known navigational route and one or more construction concerns have been identified for a geographic zone in which the vehicle is about to enter, it is preferable that step 180 send a warning or make changes to the automated driving mode ahead of time so that an alternate route can be taken. This is particularly advantageous when the potential concern that is being averted, is far beyond the range of vehicle mounted devices and is instead identified through the use of street level images provided by stationary traffic cameras or the like. The remedial action may be presented to the driver in a number of ways, such as visually, audibly, haptic, or otherwise before being executed by the automated driving mode. Further, the remedial action may be presented via a telematics unit, a control unit, a human machine interface, the internet, or through hand held devices.

Furthermore, the remedial action may vary depending on the severity of the potential concern—this relates to the optional rating or weighting mentioned before. For example, if a road is closed, which is a rather serious potential concern, the remedial action may include disabling an automated driving mode or altering the current path of the host vehicle through the automated driving mode. If the potential concern relates to a road being wet or icy, then the remedial action may simply include a warning to the driver and may require the driver to put his or her hands on the steering wheel, in the case of an automated driving mode. After taking one or more appropriate remedial action(s), the method may loop back to the beginning.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps shown in the flowchart is just one possibility, as the present method may include a combination of steps that has fewer, greater or different steps than that shown here. It is certainly possible for some of the illustrated steps (like steps 130, 170, etc.) to be combined or otherwise integrated into others. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:
1. A method of enhancing an automated driving mode of a host vehicle, comprising the steps of:
  comparing a host vehicle location to a geographic zone saved in a concern profile, and the host vehicle location corresponds to a current location of the host vehicle or an anticipated future location of the host vehicle and the concern profile is based on street level images of road segments gathered from a plurality of stationary traffic cameras;

identifying a potential concern in response to the comparison of the host vehicle location to the saved geographic zone, and the potential concern is associated with the geographic zone in the concern profile; and performing a remedial action in response to the identification of the potential concern, wherein the remedial action is performed before the host vehicle encounters the potential concern and the remedial action affects the automated driving mode of the host vehicle.

2. The method of claim 1, wherein the method further comprises the steps of:

gathering street level images from the plurality of stationary traffic cameras, and the street level images are of road segments beyond the range of sensors mounted on the host vehicle;

identifying first and second items from the street level images that pertain to a potential concern with a particular road segment;

evaluating the first and second items from the street level images and corroborating the potential concern by determining if both the first and second items verify the presence of the potential concern; and associating the potential concern with a geographic zone that corresponds to the particular road segment and is saved in the concern profile.

3. The method of claim 2, wherein the gathering step further comprises gathering high-definition street level images of road segments from the plurality of stationary traffic cameras.

4. The method of claim 3, wherein the high-definition street level images are received from the plurality of stationary traffic cameras at a back-end facility and are accompanied by at least one piece of data that puts the images into context and is selected from the group consisting of: a camera identifier, a time stamp, or a camera position.

5. The method of claim 2, wherein the identifying step further comprises monitoring video from one or more stationary traffic camera(s), extracting a high-definition still image from the video, and identifying at least one of the first and second items from the high-definition still image.

6. The method of claim 5, wherein the first item is identified from a first high-definition still image taken from a traffic camera at a first time and the second item is identified from a second high-definition still image taken from the same traffic camera at a second time, and the evaluating step further comprises evaluating the first and second items in conjunction with one another and using same camera corroboration to verify the presence of the potential concern.

7. The method of claim 5, wherein the first item is identified from a first high-definition still image taken from a first traffic camera and the second item is identified from a second high-definition still image taken from a nearby second traffic camera, and the evaluating step further comprises evaluating the first and second items in conjunction with one another and using different camera corroboration to verify the presence of the potential concern.

8. The method of claim 2, wherein the evaluating step further comprises classifying the potential concern into one or more predetermined category(ies), and at least one of the predetermined category(ies) is selected from the group consisting of: construction concerns, traffic concerns, or weather concerns.

9. The method of claim 8, wherein the identifying step further comprises identifying first and second items from the street level images where at least one of the first and second items is selected from the group consisting of: construction barrels, barricades, lane closures, lane shifts, lane marking occlusions, temporary or permanent signs, construction equipment, or work crews; and the evaluating step further comprises evaluating the first and second items from the street level images in conjunction with one another in order to corroborate the potential concern and classifying the potential concern as a construction concern.

10. The method of claim 8, wherein the identifying step further comprises identifying first and second items from the street level images where at least one of the first and second items is selected from the group consisting of: traffic jams or backups, traffic patterns, stationary or slow moving objects in the road, emergency vehicles, tow trucks, debris in the road, or emergency personnel directing traffic; and the evaluating step further comprises evaluating the first and second items from the street level images in conjunction with one another in order to corroborate the potential concern and classifying the potential concern as a traffic concern.

11. The method of claim 8, wherein the identifying step further comprises identifying first and second items from the street level images where at least one of the first and second items is selected from the group consisting of: glare on the road, snow on passing vehicles, clouded or blurred images indicating the presence of fog, smoke or high winds, active window wipers of passing vehicles, the presence of salt trucks or snow plows, lane markings that are obscured or occluded, or greater than average vehicle spacing or slower average vehicle speeds; and the evaluating step further comprises evaluating the first and second items from the street level images in conjunction with one another in order to corroborate the potential concern and classifying the potential concern as a weather concern.

12. The method of claim 2, wherein the evaluating step further comprises rating the potential concern according to its possible severity or impact on vehicles that are operating in an automated driving mode and are traveling on the particular road segment.

13. The method of claim 2, wherein at least one of the first and second items from the street level images relates to active wipers of passing vehicles, and the evaluating step further comprises corroborating the potential concern by determining if the active wipers of passing vehicles and the other of the first and second items verify the presence of a potential weather concern.

14. The method of claim 1, wherein the comparing step is performed in response to the automated driving mode for the host vehicle being activated or enabled, and the performing step further comprises making changes to the automated driving mode or disabling the automated driving mode before the host vehicle encounters the potential concern.

15. The method of claim 1, wherein the comparing step is performed in response to a navigational route being requested or generated, and the performing step further comprises making changes to the automated driving mode or disabling the automated driving mode before the host vehicle encounters the potential concern.

16. The method of claim 1, wherein the comparing step is performed in response to the host vehicle being driven into a new geographic zone, and the performing step further comprises making changes to the automated driving mode or disabling the automated driving mode before the host vehicle encounters the potential concern.

17. A method of enhancing an automated driving mode of a host vehicle, comprising the steps of:

comparing a host vehicle location to a geographic zone saved in a concern profile, and the host vehicle location corresponds to a current location of the host vehicle or an anticipated future location of the host vehicle and the concern profile is based on street level images gathered from a plurality of image sources;

identifying a potential concern in response to the comparison of the host vehicle location to the saved geographic zone, and the potential concern is associated with the geographic zone in the concern profile; and performing at least one remedial action in response to the identification of the potential concern, wherein the remedial action is performed before the host vehicle encounters the potential concern and the remedial action is selected from the group consisting of: requiring a driver of the host vehicle to acknowledge a warning while the host vehicle is operating in the automated driving mode, making changes to the automated driving mode, or disabling the automated driving mode before the host vehicle encounters the potential concern.

18. A method of enhancing an automated driving mode of a host vehicle, comprising the steps of:

gathering street level images from one or more image source(s), and the street level images are of a particular road segment that is beyond the range of sensors mounted on the host vehicle;

identifying first and second items from the street level images that pertain to a potential concern with the particular road segment;

evaluating the first and second items from the street level images and corroborating the potential concern by determining if both the first and second items verify the presence of the potential concern; and saving the potential concern in a data collection that is stored in electronic memory so that the host vehicle can later access the data collection and determine if there are any potential concerns that may affect the host vehicle when it is being driven in the automated driving mode.

\* \* \* \* \*